(12) United States Patent
Cadotte, Jr. et al.

(10) Patent No.: US 11,400,634 B2
(45) Date of Patent: Aug. 2, 2022

(54) METHODS OF FORMING UNITARY SEROLOGICAL PIPETTES

(71) Applicant: CORNING INCORPORATED, Corning, NY (US)

(72) Inventors: John Claude Cadotte, Jr., Waterboro, ME (US); Michael Kurt Schaefer, Gorham, ME (US); James Mark Seymour, Portland, ME (US); Andrew Michael Zeimen, Bay City, MI (US)

(73) Assignee: CORNING INCORPORATED, Corning, NY (US)

( * ) Notice: Subject to any disclaimer, the term of this patent is extended or adjusted under 35 U.S.C. 154(b) by 48 days.

(21) Appl. No.: 16/612,964

(22) PCT Filed: May 21, 2018

(86) PCT No.: PCT/US2018/033718
§ 371 (c)(1),
(2) Date: Nov. 12, 2019

(87) PCT Pub. No.: WO2018/217654
PCT Pub. Date: Nov. 29, 2018

(65) Prior Publication Data
US 2020/0164564 A1 May 28, 2020

Related U.S. Application Data

(60) Provisional application No. 62/511,124, filed on May 25, 2017.

(51) Int. Cl.
*B29C 49/04* (2006.01)
*B29C 49/24* (2006.01)
(Continued)

(52) U.S. Cl.
CPC .............. *B29C 49/04* (2013.01); *B29C 49/24* (2013.01); *B29C 49/4278* (2013.01);
(Continued)

(58) Field of Classification Search
CPC ..... B29C 49/4268; B29C 49/36; B29C 49/04; B29C 49/50; B29C 49/24; B29C 49/4278;
(Continued)

(56) References Cited

U.S. PATENT DOCUMENTS 2,595,493 A    5/1952   Slaby et al.
2,697,945 A   12/1954   Dovas
(Continued)

FOREIGN PATENT DOCUMENTS

BE          752032 A    6/1970
CN    202037848 U   11/2011
(Continued)

OTHER PUBLICATIONS

Chinese Patent Application No. 201680069095.X Second Office Action dated Oct. 16, 2020; 7 pages; Chinese Patent Office.
(Continued)

*Primary Examiner* — Monica A Huson
(74) *Attorney, Agent, or Firm* — Annie J. Morgan (57) ABSTRACT

A method for producing pipettes (110, 111, 112) is provided. The method includes extruding a polymer melt into at least one mold segment of a mold assembly (120) having a plurality of mold segments to form a parison (50) or preform, wherein the plurality of mold segments (122) comprise cavities (42) that are shaped to form pipettes when in communication with the cavity of an adjacent mold segment; forming at least two pipettes in the shape of the mold segment cavities by blow-molding or vacuum forming the parison or preform, each of the at least two pipettes having proximal and distal ends; heating the pipettes to form a
(Continued)

locally heated portion of the at least two pipettes; and separating the pipettes by cutting the locally heated portion of the at least two pipettes with separation feature (64, 66, 194, 196).

14 Claims, 10 Drawing Sheets

(51) Int. Cl.
*B29C 49/42* (2006.01)
*B29C 49/50* (2006.01)
*B29K 23/00* (2006.01)
*B29K 25/00* (2006.01)
*B29L 31/00* (2006.01)

(52) U.S. Cl.
CPC ...... *B29C 49/50* (2013.01); *B29C 2049/2412* (2013.01); *B29C 2793/009* (2013.01); *B29C 2793/0027* (2013.01); *B29K 2023/12* (2013.01); *B29K 2025/06* (2013.01); *B29L 2031/753* (2013.01)

(58) Field of Classification Search
CPC .... B29C 2049/2412; B29C 2793/0027; B29C 2793/009; B01L 2200/12; B01L 3/021; B29L 2031/753; B29K 2025/06; B29K 2023/12
See application file for complete search history.

(56) References Cited

U.S. PATENT DOCUMENTS

| | | | |
|---|---|---|---|
| 3,084,592 A | 4/1963 | Scott | |
| 3,258,972 A | 7/1966 | Cassaday et al. | |
| 3,394,209 A | 7/1968 | Cheney | |
| 3,457,590 A | 7/1969 | Dittmann | |
| 3,718,133 A | 2/1973 | Perry et al. | |
| 3,781,395 A | 12/1973 | Uhlig | |
| 3,834,241 A | 9/1974 | Garren et al. | |
| 4,779,768 A | 10/1988 | St. Amand | |
| 5,073,347 A | 12/1991 | Garren et al. | |
| 5,125,278 A | 6/1992 | Foldenauer | |
| 5,563,356 A | 10/1996 | Mussi et al. | |
| 5,773,305 A | 6/1998 | Zabetakis et al. | |
| 5,962,096 A | 10/1999 | Smith et al. | |
| 6,343,717 B1 | 2/2002 | Zhang et al. | |
| 6,837,119 B2 | 1/2005 | Blackwood-Sewell | |
| 6,896,005 B2 | 5/2005 | Noone et al. | |
| 8,003,041 B2 | 8/2011 | Borchert et al. | |
| 8,113,067 B2 | 2/2012 | Tanner | |
| 2002/0113341 A1 | 8/2002 | Ogawa | |
| 2002/0180115 A1 | 12/2002 | Weeks | |
| 2008/0171163 A1 | 7/2008 | Caviezel et al. | |
| 2009/0158861 A1 | 6/2009 | Tanner | |
| 2010/0248370 A1 | 9/2010 | Moynahan | |
| 2012/0009103 A1 | 1/2012 | Liu | |
| 2012/0018928 A1 | 1/2012 | Ramrakhyani et al. | |
| 2012/0096957 A1 | 4/2012 | Ochman | |
| 2014/0260697 A1 | 9/2014 | Staton et al. | |
| 2015/0367109 A1 | 12/2015 | Maeda et al. | |
| 2016/0052187 A1 | 2/2016 | Werner | |
| 2016/0318014 A1 | 11/2016 | Tubbs et al. | |
| 2017/0036203 A1 | 2/2017 | Le et al. | |

FOREIGN PATENT DOCUMENTS

| | | |
|---|---|---|
| CN | 102847566 A | 1/2013 |
| CN | 104177718 A | 12/2014 |
| CN | 105324176 A | 2/2016 |
| FR | 1304124 A | 9/1962 |
| GB | 1169954 A | 11/1969 |
| JP | 51-135593 A | 11/1976 |
| JP | 04-034490 B2 | 6/1992 |
| JP | 05-042944 A | 2/1993 |
| JP | 2006-168355 A | 6/2006 |
| WO | 2014147206 A2 | 9/2014 |
| WO | 2015011003 A1 | 1/2015 |

OTHER PUBLICATIONS

Japanese Patent Application No. 2018-526847 Office Action dated Oct. 7, 2020; 8 Pages; Japanese Patent Office.

Hartig et al; "In-Mold Surface Modification and In-Mold Printing During Injection Molding"; 27th PPS Annual Meeting, 2011, Marrakech, Morocco; 1 Page.

International Search Report and Written Opinion of the International Searching Authority; PCT/US2018/033718 dated Aug. 22, 2018; 13 Pages; European Patent Office.

Chinese Patent Application No. 201880034541.2, Office Action dated Feb. 26, 2021, 7 pages (English Translation Only); Chinese Patent Office.

Lin Zongshou, "Inorganic Non-metallic Materials Engineering", 4th Edition, 2013, 6 pages (2 pages of English translation and 4 pages of original document).

METHODS OF FORMING UNITARY SEROLOGICAL PIPETTES

This is a national stage application under 35 U.S.C. § 371 of International Application No. PCT/US2018/033718, filed on May 21, 2018, which claims the benefit of priority of U.S. Provisional Application Ser. No. 62/511,124 filed on May 25, 2017 the contents of which are relied upon and incorporated herein by reference in their entirety as if fully set forth below.

FIELD

The present disclosure generally relates to unitary serological pipettes and methods of forming the same by, for example, blow molding or vacuum forming.

BACKGROUND

Serological pipettes are used in both research laboratories and manufacturing facilities for transferring liquid volumes, typically from less than about 1.0 ml to up to about 100 ml. While some pipettes are formed from sterilizable glass and are reusable, most pipettes are formed from sterile plastic and are disposable.

Though there are several known methods of assembly, such plastic pipettes may be manufactured from polymers by known techniques such as injection molding, profile extrusion, rotomolding, thermoforming, casting, melt extrusion and extrusion coating. Generally, high molecular weight polymers are melt extruded into desired pipette structures wherein a rotating screw pushes a viscous polymer melt through an extruder barrel into a die in which the polymer is shaped to the desired form, and is then subsequently cooled and solidified into a product, that is, the extruded product, having the general shape of the die.

Conventionally, as the extruded product leaves the extruder, it is nicked or pierced by a sharp feature such as a blade or knife and techniques are utilized to apply stress in the area where the extruded product is nicked or pierced. As one example, the pipette may be redirected at an angle that causes the material to bend and apply a stress in the area where the extruded product is nicked or pierced. The application of stress results in the formation of individual pipettes through the separation of one pipette from an adjacent pipette. In order to account for thermal properties such as mold shrinkage and thermal expansion, it is often necessary for the pipette to be allowed to cool sufficiently and to stabilize before being cut. This prevents deformation of the pipette during the cutting process and also provides control of the dimensions of the pipettes and allows a manufacturer to make pipettes which meet pre-determined dimension tolerances.

Although control of the dimensions may be achieved in this manner, allowing the pipettes to cool and stabilize prior to being cut reduces the speed at which the pipettes can be manufactured. Additionally, allowing the pipettes to cool and stabilize results in pipettes which are brittle at the time they are cut. Cutting brittle pipettes results in the creation of undesirable debris within the manufacturing process. Also, cutting brittle pipettes results in the formation of a rough surface at the location where the pipette is cut. Further processing or finishing steps are required to smooth these rough surfaces to bring the pipettes into conformity with conventional specifications for edge quality of pipette products. Such further processing steps may require the removal of as much as about 0.25 inches of material to achieve an acceptable edge quality. As such, conventional cutting techniques leads to increases in manufacturing times, results in material waste and contributes to increased part costs.

SUMMARY

According to an embodiment of the present disclosure a method for producing pipettes is provided. The method includes extruding a polymer melt into at least one mold segment of a mold assembly having a plurality of mold segments to form a parison or preform, wherein the plurality of mold segments comprise cavities that are shaped to form pipettes when in communication with the cavity of an adjacent mold segment; forming at least two pipettes in the shape of the mold segment cavities by blow-molding or vacuum forming the parison or preform, each of the at least two pipettes having proximal and distal ends; heating the pipettes to form a locally heated portion of the at least two pipettes; and separating the pipettes by cutting the locally heated portion of the at least two pipettes with separation feature.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

As used herein, "have," "having," "include," "including," "comprise," "comprising" or the like are used in their open ended sense, and generally mean "including, but not limited to."

All scientific and technical terms used herein have meanings commonly used in the art unless otherwise specified. The definitions provided herein are to facilitate understanding of certain terms used frequently herein and are not meant to limit the scope of the present disclosure.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

The present disclosure relates to unitary serological pipettes. According to embodiments of the present disclosure, unitary serological pipettes may be manufactured with improved product reliability and functional performance. Further, the presently disclosed manufacturing methods may reduce the cost and material waste and increase the speed of production of unitary serological pipettes.

Figure 1A:
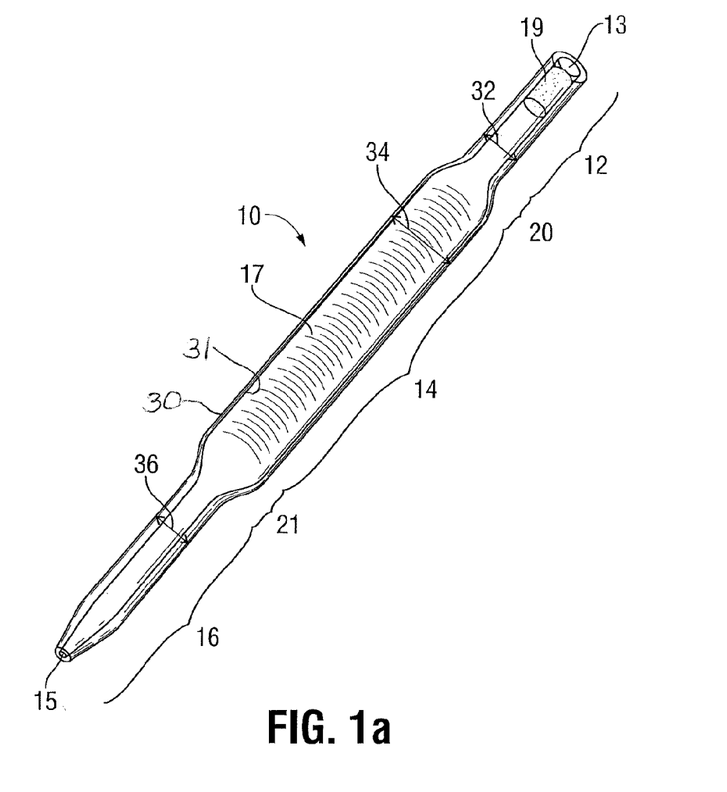
FIGS. 1a-1d illustrates an example of a unitary serological pipette according to the present disclosure.
Figure 1B:
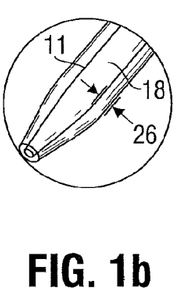
Figure 1C:
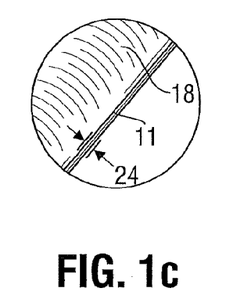
Figure 1D:
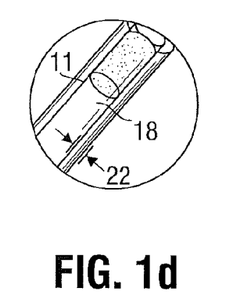

According to an embodiment of the present disclosure, FIGS. 1a-1d illustrate an example pipette 10 according to the present disclosure, which may be formed according to the methods disclosed in the present disclosure. As shown in FIGS. 1b (showing the tip region 16), 1c (showing the body region 14) and 1d (showing the mouth region 12), the pipette 10 may comprise an inner curved surface 11 that encloses a space 18. The pipette 10 may comprise a longitudinal axis. The pipette 10 may comprise a mouth 13 and a tip 15. The pipette may comprise a filter 19. The pipette 10 may comprise a series of volumetric markings 17 to indicate a current volume of a liquid stored within the pipette 10. The pipette 10 may be suitably sized to hold a particular volume of liquid, e.g., 1 mL, 2 mL, 5 mL, 10 mL, 25 mL, 50 mL, or 100 mL. The pipette 10 may be manufactured from any suitable material, including polymers such as polystyrene and polypropylene, and glass. The pipette 10 may have a mouth region 12, a body region 14, and a tip region 16, portions of each of which are shown in enlarged views in FIGS. 1b-1d. Each region may have a corresponding wall thickness—a mouth thickness 22, a body thickness 24, and a tip thickness 26—and a corresponding diameter—a mouth diameter 32, a body diameter 34, and a tip diameter 36. The pipette 10 may have a mouth-body transition region 20 between the mouth region 12 and the body region 14. The pipette 10 may have a body-tip transition region 21 between the body region 14 and the tip region 16.

The mouth, body, and tip diameters 32, 34, 36 may each be measured externally. Optionally, the mouth thickness 22, the tip thickness 26, or both the mouth thickness 22 and the tip thickness 26 may be similar to the body thickness 24. For example, the mouth thickness 22, tip thickness 26, and body thickness 24 may each be between 0.4 mm and 1.5 mm, or between 0.6 mm and 1.0 mm, or 0.75 mm. Optionally, the mouth thickness 22, tip thickness 26, or both the mouth thickness 22 and the tip thickness 26 may be thicker than the body thickness 24. For example, the mouth thickness 22 and tip thickness 26 may each be between 0.3 mm and 2.5 mm, or between 0.5 mm and 1.0 mm, or 0.75 mm. For example, the body thickness 24 may be less than 0.6 mm, or less than 0.4 mm, or approximately 0.25 mm. The diameters 32, 34, 36 may each be measured between opposing points on an outer surface of the pipette 10. The body diameter 34 may be greater than either the mouth diameter 32 or the tip diameter 36. For example, the body diameter 34 may be between 4.0 mm and 25.0 mm. The specific body diameter 34 may depend on the volume of liquid the pipette 10 is sized to hold. Depending on the volume, the body diameter 34 may be between 4.0 mm and 5.0 mm, or approximately 4.5 mm; or between 6.0 mm and 7.0 mm, or approximately 6.5 mm; or between 7.5 mm and 8.5 mm, or approximately 8.0 mm; or between 9.0 mm and 10.0 mm, or approximately 9.5 mm; or between 14.0 mm and 15.0 mm, or approximately 14.5 mm; or between 17.5 and 18.5 mm, or approximately 18.0 mm; or between 24.0 mm and 25.0 mm, or approximately 24.5 mm. Example body diameters, body thicknesses, and tip thicknesses corresponding to different pipette volumes of blow-molded pipettes are shown in Table I below.

TABLE I

| Pipette Volume (mL) | Body outer Diameter (mm) | Body Thickness (mm) | Tip Inner Diameter (mm) | Tip Thickness (mm) | Mouth outer Diameter (mm) | Mouth Thickness (mm) |
| --- | --- | --- | --- | --- | --- | --- |
| 1 | 3.5-5.0 | 0.25-0.7 | 1.5-5.0 | 0.3-1.3 | 3.5-5.0 | 0.3-1.3 |
| 2 | 4.5.0-7.0 | 0.25-0.7 | 1.5-7 | 0.3-1.3 | 4.5-7.0 | 0.3-1.3 |
| 5 | 6.0-8.5 | 0.25-0.70 | 1.0-3.0 | 0.3-1.3 | 6.0-8.5 | 0.3-1.3 |
| 10 | 8..0-10.0 | 0.25-0.70 | 1.0-5 | 0.3-1.3 | 7.0-8.5 | 0.3-1.3 |
| 25 | 13.0-15.0 | 0.25-0.70 | 1.0-4.0 | 0.3-2.5 | 7.0-8.5 | 0.5-2.5 |
| 50 | 16.0-18.5 | 0.25-0.70 | 1.0-4.0 | 0.3-2.5 | 7.0-8.5 | 0.5-2.5 |
| 100 | 22.5.0-25.0 | 0.25-0.70 | 1.0-4.0 | 0.3-2.5 | 7.0-8.5 | 0.5-2.5 |

The enhanced thickness in the mouth and tip regions 12, 16 may provide certain advantages during use—e.g., the mouth and tip regions 12, 16 may be harder to damage or break than they would be if they were thinner. In addition, when packaged in sterile packaging, the thicker mouth and/or tip regions 12, 16 are less likely to break the sterile packaging, which may reduce the risk of contamination prior to use. The particular mouth, body, and tip thicknesses 12, 14, 16 may be created as a result of using blow molding or vacuum forming to produce the pipette 10.

Optionally, the pipette 10 may have no bumps or ridges in the mouth-body transition region 20 between the mouth region 12 and the body region 14 or in the body-tip transition region 21 between the body region 14 and the tip region 16, either in the inside surface 31 of the pipette or the outside surface 30 of the pipette. The transition regions 20, 21 that lack bumps or ridges may be referred to as substantially smooth transition regions. The lack of bumps or ridges in the substantially smooth transition regions 20, 21 may be as a result of using blow molding or vacuum forming to produce the pipette 10 as a single piece, instead of forming one or more of the regions 12, 14, 16 separately and then subsequently joining the regions 12, 14, 16 (e.g., by welding, which may produce weld seams). The substantially smooth inside surface 31 in transition regions 20, 21 may reduce particulate and fluid retention that could otherwise accumulate around bumps or ridges in such regions. For at least this region, the substantially smooth transition regions 20, 21 may improve performance of the pipette 10 for example enhancing the accuracy of the volumetric markings 17. For example, when a pipette is assembled, by first drawing or forming a pipette body and then attaching a tip region or mouth region or both, there will be a seam or a mismatch or a step or a bump or a ridge in the internal or external surface of the pipette where this connection is made. In addition, there may be residue or particulate created during the assembly process (ultrasonic welding, for example) which may create unwanted contaminants inside the pipette.

Figure 2A:
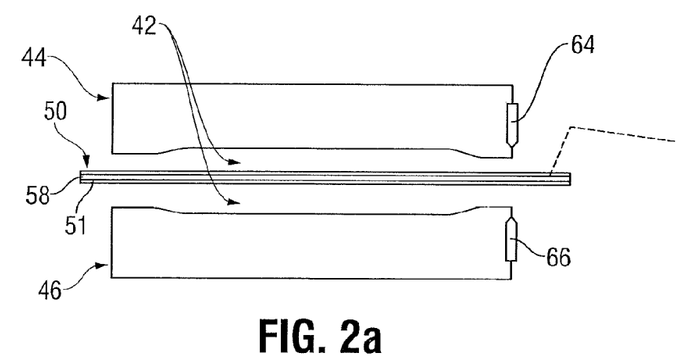
FIGS. 2a-2d illustrate an example method of forming a unitary serological pipette by blow molding according to the present disclosure.
Figure 2B:
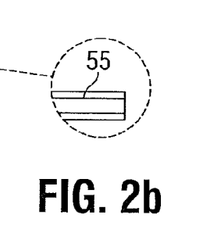
Figure 2C:
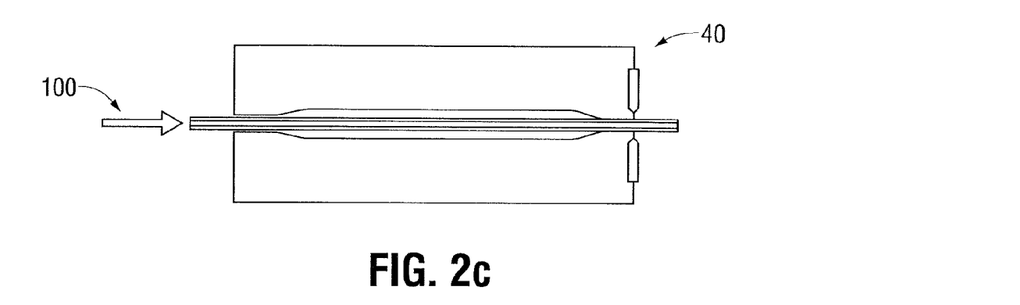
Figure 2D:
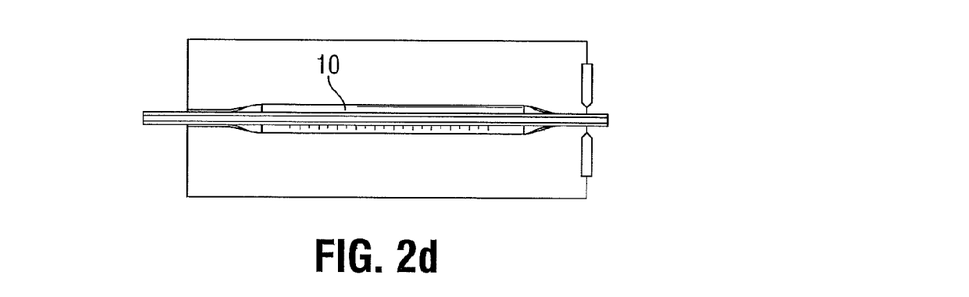

FIGS. 2a-2d illustrate an example method for producing a pipette 10 using blow molding. A parison 50 (or a tube or preform) may be inserted into a mold 40. Typically, the parison 50 will be in the shape of a hollow cylinder. Optionally, the parison 50 could be a hollow hexagonally-walled prism, or another shape. The parison 50 may comprise an inner curved surface 51 that encloses a space 58. As shown in FIG. 2b, the parison 50 may have a parison thickness 55. The parison 50 may be manufactured from any suitable material, including polymers such as polystyrene and polypropylene, and glass. The parison 50 may be manufactured, for example, by extruding a polymer melt to form a hollow, cylindrical tube. Prior to insertion, the parison 50 may be heated to a temperature within the softening range of the material from which the parison 50 is made. The softening range includes a range of temperatures at which the material is readily formable. The mold may comprise a mold cavity 42. The mold may comprise mold halves 44, 46. The mold may comprise mold end features 64, 66, which may be blades, knives, or sharp edges used to cut or score a parison 50 or pipette 10. As illustrated in FIGS. 2a and 2c, the mold halves 44, 46 may close around the parison 50 rather than inserting the parison 50 into mold halves 44, 46 that are already closed. As illustrated in FIG. 2c, compressed air 100 may be introduced into the space 58, creating a differential pressure. The compressed air may be at a pressure of, for example, 0.05-1.5 MPa. As shown in FIG. 2d, the positive air pressure within the space 58 pushes the parison 50 into the mold cavity 42 to form a pipette 10 in the shape of the mold cavity 42. Forming the pipette 10 by blow molding may enhance the toughness of the pipette 10 due to biaxial expansion during the blow molding process. During molding, surface features such as volumetric markings 17 may be introduced to the surface of the pipette 10. These surface features may be created by several different techniques, either alone or in connection with each other. These techniques include printing or imprinting the mold cavity 42 to create mold surface features that corresponding pipette surface features during molding; or depositing ink on the surface of the mold cavity 42 that is then transferred to an outer surface of the pipette 10 during molding; or inserting a label into the mold cavity 42 that attaches to an outer surface of the pipette 10 during molding.

Once the pipette 10 has cooled sufficiently, the mold 40 may be opened, for example by opening the mold halves 44, 46, and the pipette 10 may be ejected. Optionally, the mold halves 44, 46 may be opened in an arc shape. A new parison may then be inserted into the mold 40, and the process may be repeated.

Figure 3A:
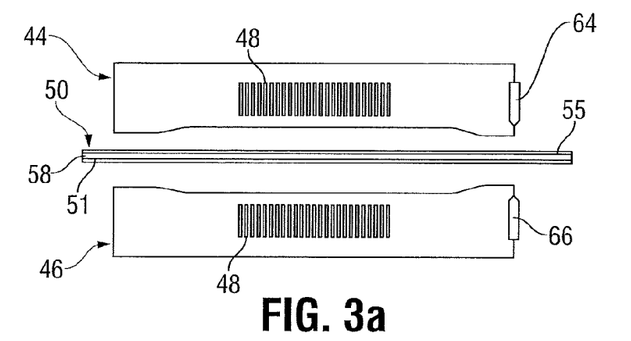
FIGS. 3a-3c illustrate an example method of forming a unitary serological pipette by vacuum forming according to the present disclosure.
Figure 3B:
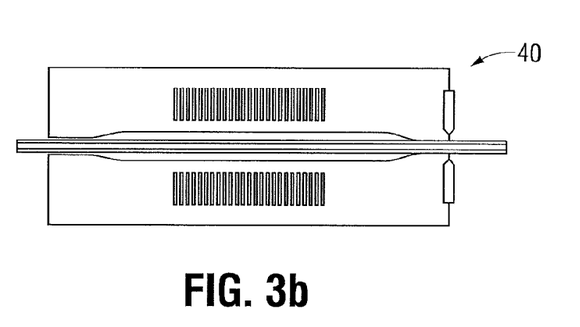
Figure 3C:
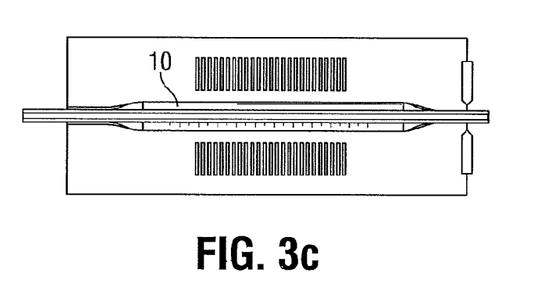

FIGS. 3a, 3b, and 3c illustrate an example method for producing a pipette 10 using vacuum forming. The vacuum forming process is similar to the blow molding process described above, except that the vacuum forming process relies on using a negative differential pressure outside a parison 50 instead of a positive differential pressure inside the parison 50. A parison 50 (or a tube or preform) may be inserted into a mold 40. Prior to insertion, the parison 50 may be heated to a temperature within the softening range of the material from which the parison 50 is made. As illustrated in FIGS. 3a and 3b, the mold halves 44, 46 may close around the parison 50. In contrast to the blow molding process, as illustrated in FIG. 3c, a negative air pressure may be introduced in the mold cavity 42 (outside the parison 50) by introducing a vacuum via vacuum cavities 48. The introduced vacuum may be at a pressure of, for example, 0.01 to 0.09 MPa. The negative air pressure in the mold cavity 42 draws the parison 50 into the shape of the mold cavity 42. Once the pipette 10 has cooled sufficiently, the mold 40 may be opened, for example by opening the mold halves 44, 46, and the pipette 10 may be ejected. A new parison may then be inserted into the mold 40, and the process may be repeated.

Figure 4A:
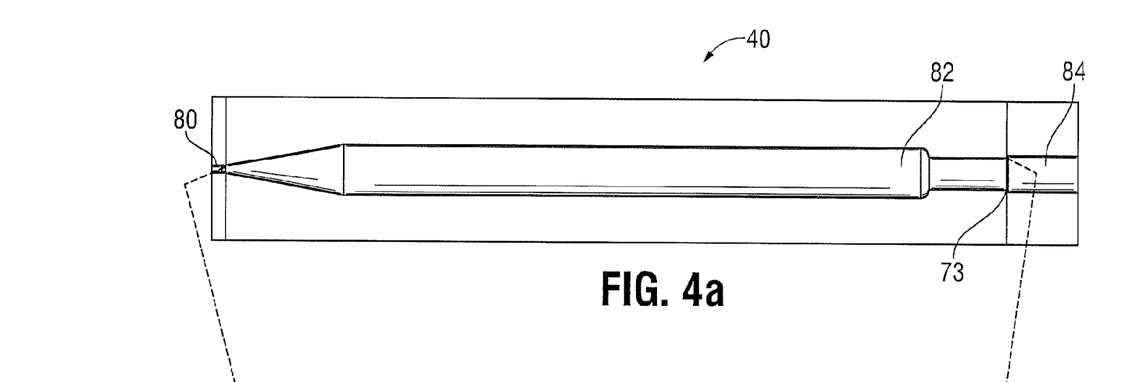
FIGS. 4a-4c illustrate an example mold comprising a mold in-score feature according to the present disclosure.
Figure 4B:
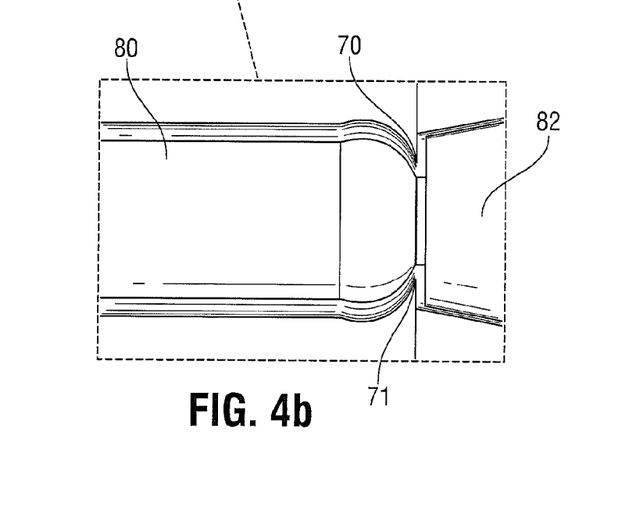
Figure 4C:
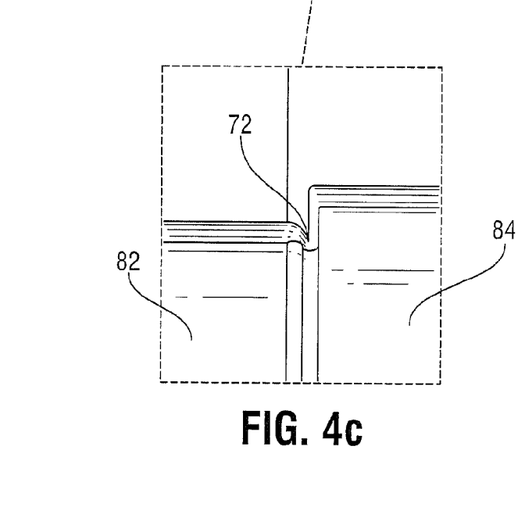

FIGS. 4a-4c illustrate a mold 40 comprising mold cavities 80, 82, 84 and in-score features 70, 71, 72, 73. As illustrated in FIG. 4a, a mold 40 may comprise one or more in-score features 70, 71, 72, 73, which may each act as an undercut. The in-score features 70, 71, 72, 73, are designed to score a pipette 10 in the mouth and tip regions 12, 16, to assist with forming a mouth 13 and tip 15. The in-score features 70, 71, 72, 73 may all be located within a single mold cavity 80 or may be located in separate, adjacent mold cavities 80, 82, 84 or even separate adjacent molds. As the different mold cavities 80, 82, 84 separate, the separating mold 40 applies a force on the in-score features 70, 71, 72, 73 causing excess pipette material to separate from the pipette. Optionally, a temperature differential between the different mold cavities 80, 82, 84 may beneficially increase stress at the in-score features 70, 71, 72, 73, leading to enhanced separation efficiency. The use of the in-score features 70, 71, 72, 73 can eliminate or reduce the need for post-molding cutting processes conducted outside of the mold.

Figure 5A:
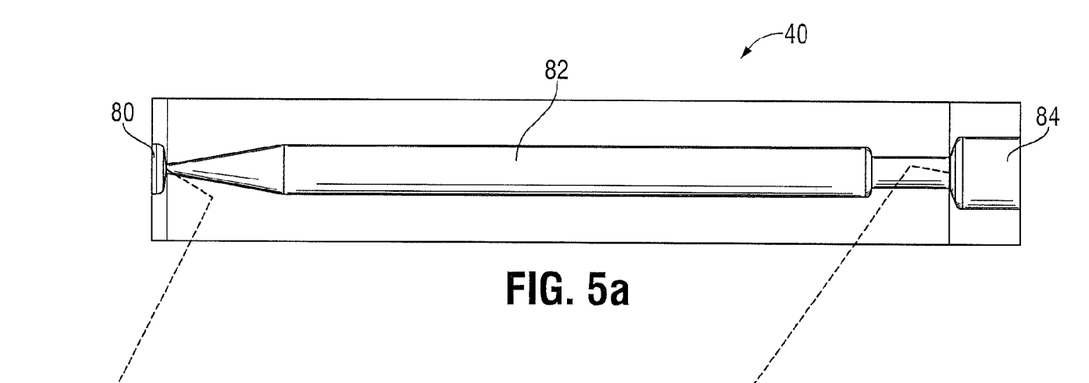
FIGS. 5a-5e illustrate an example mold comprising a mold in-cut feature according to the present disclosure.
Figure 5B:
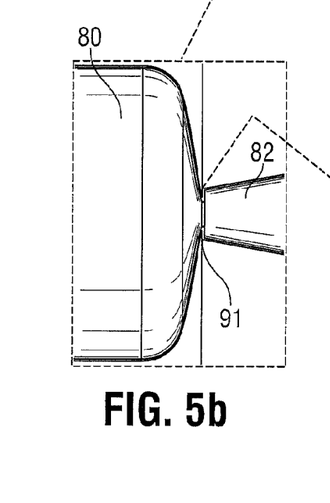
Figures 5C, 5D:
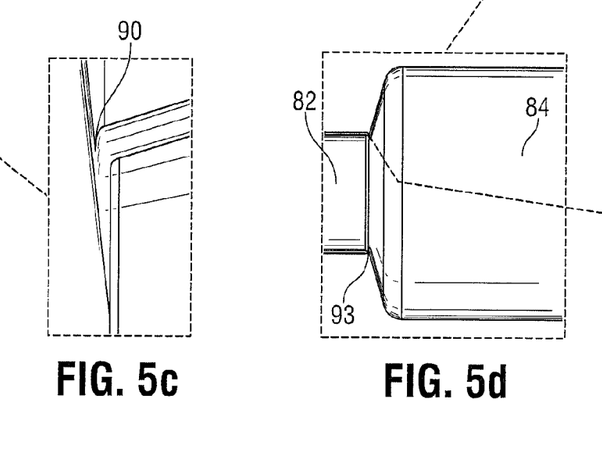
Figure 5E:
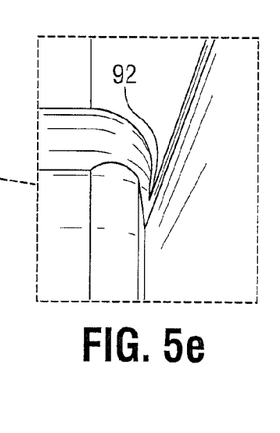

FIGS. 5a-5e illustrate a mold 40 comprising mold cavities 80, 82, 84 and in-cut features 90, 91, 92, 93. As illustrated in FIG. 5a, the mold 40 may comprise one or more in-cut features 90, 91, 92, 93, which may each provide a sharp point. When a parison 50 is blow molded (or vacuum formed) into a pipette 10, the sharp point of the in-cut features 90, 91, 92, 93, may cause pipette material to thin sufficiently at or near to the in-cut features 90, 91, 92, 93 that the pipette 10 is separated from an adjacent pipette or adjacent pipette material, thus forming a mouth 13 and tip 15 in the pipette 10. The larger diameters of the mold cavities 80 and 84 at the site of the in-cut features 90, 91, 92, 93 may assist with thinning the pipette material, and thus with the cutting process. The in-cut features 90, 91, 92, 93 may all be located within a single mold cavity 80 or may be located in separate, adjacent mold cavities 80, 82, 84 or even separate adjacent molds. The use of the in-cut features 90, 91, 92, 93 can eliminate or reduce the need for post-molding cutting processes conducted outside of the mold.

Figure 6A:
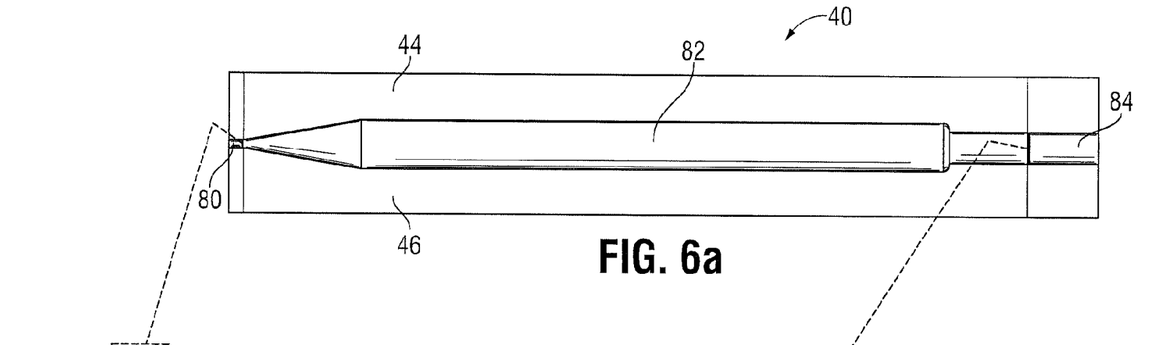
FIGS. 6a-6e illustrate an example mold comprising an alternative mold in-cut feature according to the present disclosure.
Figure 6B:
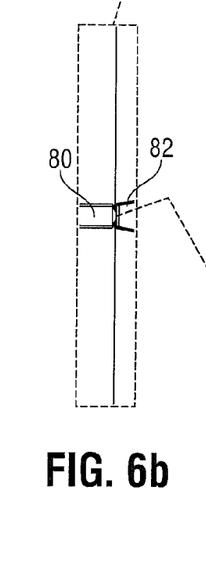
Figure 6C:
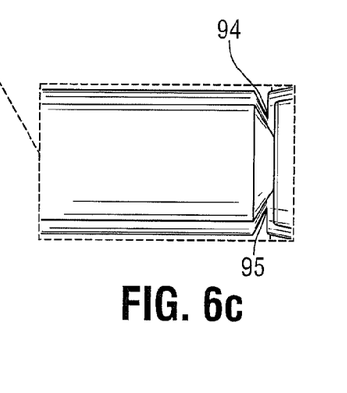
Figure 6D:
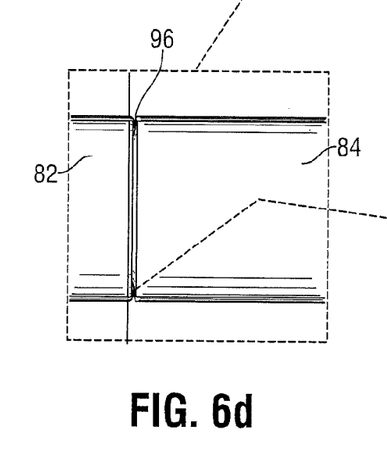
Figure 6E:
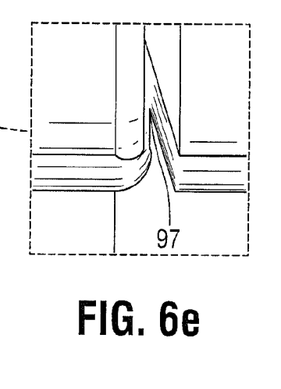

FIGS. 6a-6e illustrate a mold 40 comprising mold cavities 80, 82, 84 and in-cut features 94, 95, 96, 97. As illustrated in FIG. 6a, the mold 40 may comprise one or more in-cut features 94, 95, 96, 97, which may each provide a sharp point. A parison 50 may be extruded into the mold cavities 80, 82, 84. The diameter of the parison 50 may be equal to the diameter of the pipette's outer mouth diameter, or inner tip diameter. The sharp point of the in-cut features 94, 95, 96, 97 may protrude from the mold halves 44, 46 so that when the mold 40 is closed, the parison 50 is cut at the location of the sharp point due to the interference contact between the in-cut features 94, 95, 96, 97 and the parison 50. The in-cut features 94, 95, 96, 97 may all be located within a single mold cavity 80 or may be located in separate, adjacent mold cavities 80, 82, 84 or even separate adjacent molds. The use of the in-cut features 94, 95, 96, 97 can eliminate or reduce the need for post-molding cutting processes conducted outside of the mold.

Figure 7:
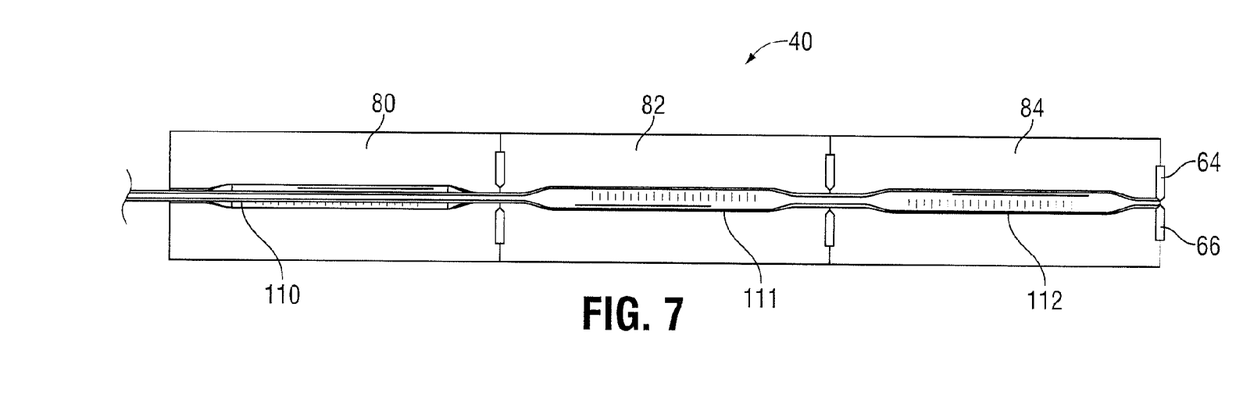
FIG. 7 illustrates an example of a series of three unitary serological pipettes being formed according to the present disclosure.

FIG. 7 illustrates a mold 40 comprising mold cavities 80, 82, 84 in which three pipettes 110, 111, 112 have been formed. The pipettes 110, 111, 112 may be drawn and separated in accordance with separation features as described in further detail below. As one example, the pipettes 110, 111, 112 may be cut by mold features 64, 66, which may be blades, knives, or sharp edges used to cut or score a parison 50 or pipette 112. As will be described with reference to FIGS. 10-13, other exemplary separation features may include separation cavities 184, 186 (illustrated in FIG. 10), pinch features 194, 196 (illustrated in FIGS. 11-12) or molds of a mold assembly having off-set centerlines (illustrated in FIG. 13).

Optionally, pipettes 110 and 111 may be arranged such that their tip regions are adjacent to each other. Optionally, pipettes 111 and 112 may be arranged such that their mouth regions are adjacent to each other. Arranging the pipettes tip-to-tip and mouth-to-mouth may enhance production efficiency and reduce production costs. For example, the amount of scrap pipette material generated may be reduced by arranging the pipettes tip-to-tip and mouth-to-mouth. As an alternative, pipettes 111 and 112 may be arranged such that the mouth region of a first of pipettes 111 and 112 is adjacent to the tip region of the other of pipettes 111 and 112. The large step change from the mouth thickness to the tip thickness provides a position in the mold 40 where force on the pipettes 111 and 112 facilitates separation and may lead to enhanced separation efficiency.

Figure 8:
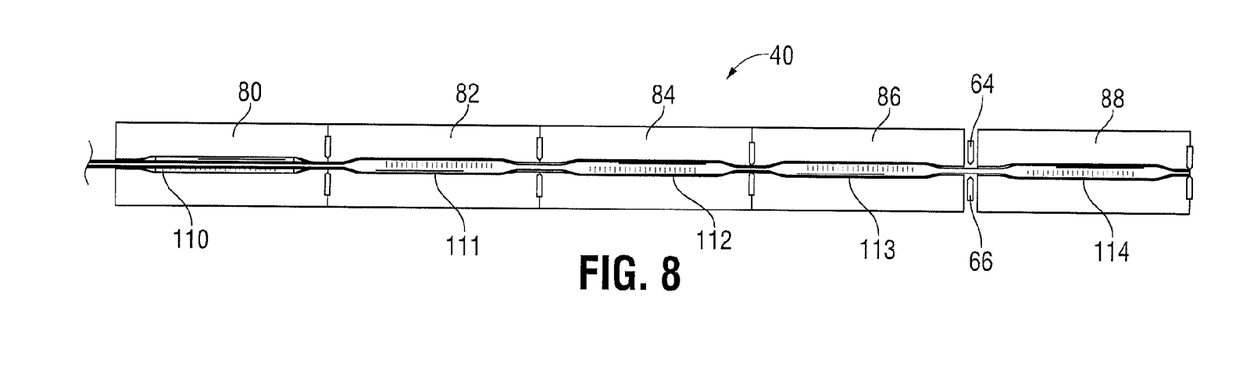
FIG. 8 illustrates an example of a series of five unitary serological pipettes being formed according to the present disclosure.

FIG. 8 illustrates a mold 40 comprising mold cavities 80, 82, 84, 86, 88 in which five pipettes 110, 111, 112, 113, 114 have been formed. The pipettes 110, 111, 112, 113, 114 may be drawn and cut by mold features 64, 66, which may be blades, knives, or sharp edges used to cut or score a parison 50 or pipette 113. For example, pipettes 112, 113 may be drawn to form tip regions in each pipette. If pipettes 112, 113 are drawn to form tip regions, the tip thicknesses will likely be smaller than described above (i.e., may be less than 0.4 mm). The pipettes 112, 113 may then be cut (e.g., using mold features 64, 66) to form tips in each pipette. Similarly, pipettes 113, 114 may be drawn to form mouth regions in each pipette. The pipettes 113, 114 may then be cut (e.g., using mold features 64, 66) to form mouths in each pipette. Optionally, a filter may be inserted into the mouth region of each of pipettes 113, 114. Forming the pipettes in a series or in an assembly line may enhance production speeds. For example, as many as 2,400 pipettes may be formed per minute in a mold 40 with four mold cavities. Optionally, the mold cavities may be arranged in a circular arrangement so that they are parallel along their longitudinal axes. Such a circular arrangement may provide additional advantages in terms of enhancing production speeds and efficiency.

Figure 9:
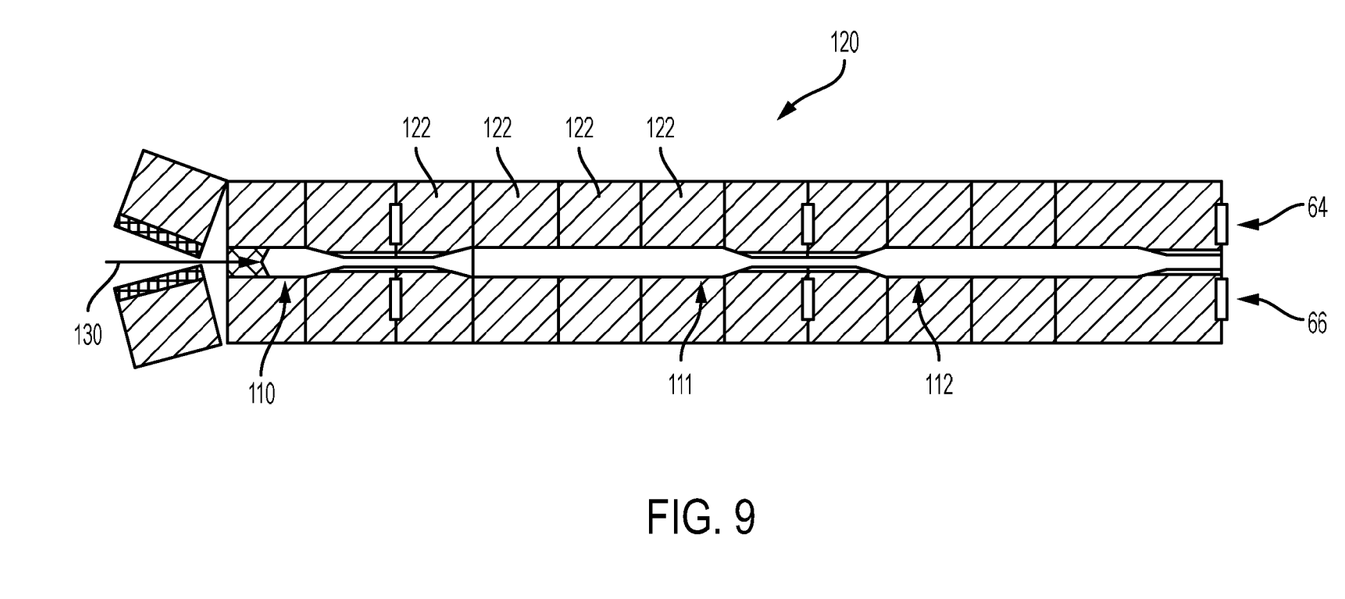
FIG. 9 illustrates an example of a series of serological pipettes being formed according to the present disclosure.

FIG. 9 illustrates a mold assembly 120 comprising a plurality of mold assembly segments 122. As an alternative to preforming a parison and inserting the parison into the mold, a polymer melt is extruded from extruder output 130 to form a parison or preform while contacting the parison or preform with the plurality of mold assembly segments 122 in succession. The mold assembly segments 122 include cavities when combined as the mold assembly 120 that are shaped to form the pipettes 110, 111, 112 in a plurality of portions the size of the mold assembly segments 122. The mold assembly segments 122 may have a length of between about 0.25 inches and about 14 inches. For example, the mold assembly segments 122 may have a length of between about 0.50 inches and about 10 inches, or between about 1.0 inches and about 7.0 inches or even between about 2.0 inches and about 4.0 inches. Compressed air may be applied intermittently or continuously into the mold assembly 120 to form pipettes 110, 111, 112 in the shape of the mold assembly 120. Alternatively, a negative air pressure may be intermittently or continuously introduced in the mold assembly 120 (outside the pipettes 110, 111, 112) by introducing a vacuum via vacuum cavities (not shown). Where compressed air or negative air pressure are continuously introduced, the mouth, body, and tip of the pipettes 110, 111, 112 may be formed by varying the speed in which the mold assembly segments 122 are contacted with the pipettes 110, 111, 112 and/or by varying the output speed of the extruder output 130. The pipettes 110, 111, 112 may be drawn and cut by mold features 64, 66, which may be blades, knives, or sharp edges used to cut or score the pipettes 110, 111, 112.

Embodiments where a parison is not preformed may enhance production speeds. Radial witness lines may be formed from the mold assembly segments 122 and axial witness lines may be formed from the molds contacting the mold assembly 120 on a parting line. These witness lines could be surface features that may function as volumetric markings in various pipette applications.

Methods disclosed herein are described as including applying compressed air or negative air pressure to produce pipettes as described herein. However, it is also contemplated that embodiments of the present disclosure may also apply material memory when forming the pipettes. Material memory, as used herein, is the propensity of materials, particularly plastics, to return to a previous shape or size upon the relief of internal stresses, produced, for example, by molecular orientation when blow molding an article from a preform. In certain embodiments, material memory may be utilized to move, or may aid in moving, the parison 50 into the mold cavity 42, or the cavities of the mold assembly segments 122, to form a pipette. In pipettes having small thicknesses, material memory may be sufficient to move the parison 50 to form the shape of the pipette. However, in certain embodiments material memory may be utilized in combination with applying compressed air or negative air pressure to form the shape of the pipette.

Embodiments of the present disclosure further relate to methods and mold features which facilitate forming individual pipettes by separating a pipette from an adjacent pipette or adjacent pipette material. Separation features and separation methods will be described with reference to FIGS. 10-13 in which certain separation features are illustrated in either one or both of (a) molds in which a parison is preformed and inserted into the mold and formed using either a negative differential pressure outside a parison 50 or a positive differential pressure inside the parison 50, or (b)

a plurality of mold assembly segments 122 in which a polymer melt is extruded from extruder output 130 to form a parison or preform while contacting the parison or preform with the plurality of mold assembly segments 122 in succession. Where the separation features are illustrated only in one of (a) or (b), it should be appreciated that each of the separation features and separation processes described herein may be included in the other of (a) or (b) in which the particular separation feature is not illustrated.

Figure 10:
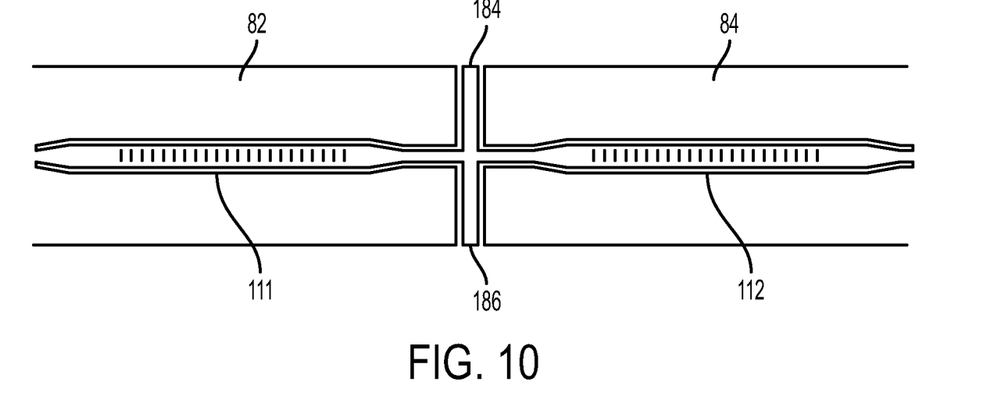
FIG. 10 illustrates an example mold comprising a separation cavity according to the present disclosure.

FIG. 10 illustrates an example mold comprising a separation cavity according to the present disclosure. As shown, an area between adjacent mold cavities 82, 84 may include at least one separation cavity 184, 186. As the different mold cavities 82, 84 separate, the pipette material expands into the at least one separation cavity 184, 186 and the thickness of the pipette material decreases within the at least one separation cavity 184, 186. Such a decrease in thickness of the pipette material in turn causes the material to split, thus providing a point at which the adjacent pipette material is separated in-mold and individual pipettes 111, 112 are formed. Preferably, the pipettes 111, 112 are separated in-mold. However, in the alternative, the at least one separation cavity 184, 186 may provide a relatively weak area between the pipettes 111, 112 where the pipettes 111, 112 can be easily separated after they are removed from the mold. As described above, the pipettes 111, 112 may be arranged tip-to-tip, mouth-to-mouth or such that the mouth region of a first of pipettes 111 and 112 is adjacent to the tip region of the other of pipettes 111 and 112.

The at least one separation cavity 184, 186 as shown in FIG. 10 is illustrated as having an opening in communication with mold cavities 42 and equal length walls extending from the opening parallel to one another. However, the at least one separation cavity 184, 186 as described herein is not limited to such a shape and may be any shape which forms a cavity in communication with the mold cavities 42. For example, the walls of the at least one separation cavity 184, 186 may extend from the opening to form a round or oval cavity. As another example, the walls of the at least one separation cavity 184, 186 may extend from the opening at an oblique angle.

Figure 11:
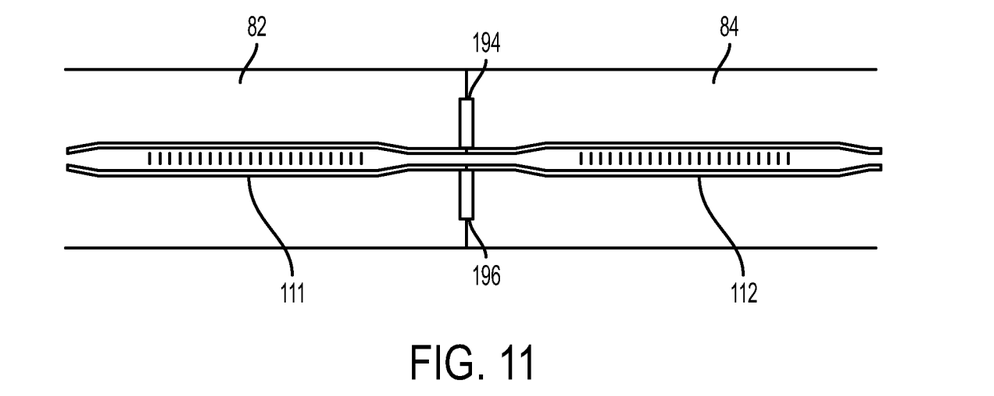
FIG. 11 illustrates an example mold comprising a mold pinch feature according to the present disclosure.
Figure 12:
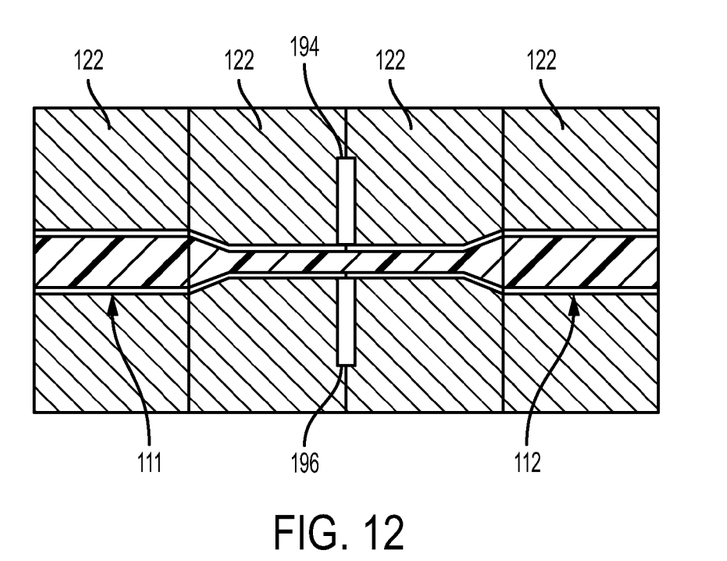
FIG. 12 illustrates an example mold assembly comprising a mold pinch feature according to the present disclosure.

FIG. 11 illustrates an example mold comprising a mold pinch feature according to the present disclosure. FIG. 12 illustrates an example mold assembly comprising a mold pinch feature according to the present disclosure. As shown in FIG. 11, an area between adjacent mold cavities 82, 84 may include at least two opposing pinch features 194, 196, or, as shown in FIG. 12, at least one of the mold assembly segments 122 may include at least two opposing pinch features 194, 196. As opposed to mold end features 64, 66, which may be blades, knives, or sharp edges, the at least two opposing pinch features 194, 196 comprise flat surfaces which, as the mold halves 44, 46 close around the parison 50, or as polymer is extruded into the cavities of the mold assembly segments 122, come together to form a pinching location. The pinching location between the at least two opposing pinch features 194, 196 forms an area of decreased pipette material thickness. Such decreased thickness of the pipette material in turn causes the material to split, thus providing a point at which the adjacent pipette material is separated in-mold and individual pipettes 111, 112 are formed. Preferably, the pipettes 111, 112 are separated in-mold. However, in the alternative, the pinching location between the at least two opposing pinch features 194, 196 may provide a relatively weak area between the pipettes 111, 112 where the pipettes 111, 112 can be easily separated after they are removed from the mold.

The at least two opposing pinch features 194, 196 may be configured such that the pinch features 194, 196 are not stationary. For example, the at least two opposing pinch features 194, 196 may be configured to move within the mold cavities 82, 84, or within the cavities of the mold assembly segments 122, such that the flat surface of a first of the pinch features 194 moves towards the flat surface of a second of the pinch features 196 to apply pressure on the pipette material at the pinching location. Such pressure may facilitate forming a point at which the adjacent pipette material is separated in-mold and individual pipettes 111, 112 are formed.

Alternatively, a pinching location may be formed within the mold cavities 82, 84, or within the cavities of the mold assembly segments 122, without the at least two opposing pinch features 194, 196. Within mold cavities 82, 84, an area between the pipettes 111, 112 may include a narrow passage in which an area of decreased pipette material thickness is formed. Such decreased thickness of the pipette material in turn causes the material to split, thus providing a point at which the adjacent pipette material is separated in-mold and individual pipettes 111, 112 are formed. Similarly, some of the cavities of the mold assembly segments 122 may include a narrow passage in which an area of decreased pipette material thickness is formed. Such area of decreased pipette material thickness may cause the material to split. However, in a mold assembly 120 such as is shown in FIG. 9, insertion of subsequent mold assembly segments 122 may apply pressure on the pipette material within the narrow passage. Such pressure may facilitate forming a point at which the adjacent pipette material is separated in-mold and individual pipettes 111, 112 are formed.

Figure 13:
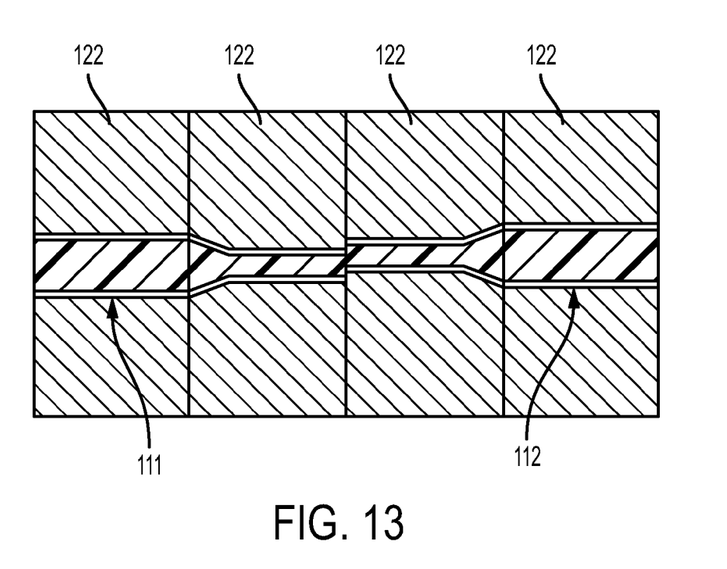
FIG. 13 illustrates an example mold assembly comprising adjacent molds having off-set centerlines according to the present disclosure.

FIG. 13 illustrates an example mold assembly comprising adjacent molds having off-set centerlines according to the present disclosure. As shown, the offset centerlines of adjacent mold assembly segments 122 forms an interface between the adjacent mold assembly segments 122 where pipette material is sheared, thus providing a point at which the adjacent pipette material is separated in-mold and individual pipettes 111, 112 are formed. Preferably, the pipettes 111, 112 are separated in-mold. However, in the interface between the adjacent mold assembly segments 122 may form a step between the pipettes 111, 112 where the pipettes 111, 112 can be easily separated after they are removed from the mold. As described above, the pipettes 111, 112 may be arranged tip-to-tip, mouth-to-mouth or such that the mouth region of a first of pipettes 111 and 112 is adjacent to the tip region of the other of pipettes 111 and 112.

According to embodiments of the present disclosure, the temperature conditions within the mold cavities 82, 84 or within the mold assembly segments 122, may be controlled to facilitate separating a pipette from an adjacent pipette or adjacent pipette material. As one example, the areas between the pipettes may be locally cooled relative to the other areas of the mold cavities 82, 84 or the cavities of the mold assembly segments 122, to facilitate separation of the pipette from an adjacent pipette or adjacent pipette material. As another example, the areas between the pipettes may be locally heated relative to the other areas of the mold cavities 82, 84 or the cavities of the mold assembly segments 122, to facilitate shrinking of the pipette material and separation of the pipette from an adjacent pipette or adjacent pipette material. Temperature conditions as described above may be created by locally controlling the temperature of the air or the temperature of the construction materials of the mold cavity/mold assembly segment material in the areas between the pipettes.

According to embodiments of the present disclosure, the utilization of mold assembly segments 122 also enables local heating of the areas between the pipettes and allows for the use of other separation features, which have not been conventionally utilized, to improve separation of a pipette from an adjacent pipette or adjacent pipette material. By locally heating the areas between the pipettes, the viscosity of the pipette material is increased and a pipette may be more easily separated from an adjacent pipette or adjacent pipette material. Instead of utilizing passive cutting features that nick, pierce or score the material at relatively cooler temperatures, so-called "through-cut" features, such as flying knives or guillotine mechanisms, may be utilized to cut the pipettes at the portions where local heating is applied. Preferably, through-cut features are provided within the mold assembly 120 such that the pipettes 111, 112 are separated in-mold.

As a result of cutting at the locally heated portion of the pipette material, the thermal properties conventionally accounted for in the extrusion of pipettes need not be stabilized prior to separating a pipette from an adjacent pipette or adjacent pipette material. Additionally, cutting at the locally heated portion of the pipette material eliminates the creation of undesirable debris that is a byproduct of conventional pipette manufacturing processes. Moreover, cutting at the locally heated portion of the pipette material eliminates the formation of a rough surface at the location where the pipette is cut. Thus, embodiments of the present disclosure also eliminate a need for further processing or finishing steps to smooth rough surfaces. This in turn reduces material waste attributable to conventional pipette manufacturing processes.

As described herein, local heating may be accomplished by utilizing a heat source within the mold assembly 120 near the areas between the pipettes to be locally heated. Alternatively, slow-cooling techniques may be utilized within the mold assembly 120 to prevent excessive transfer of heat from the pipette or pipette material to the surrounding environment or to the mold assembly segments 122. Such slow-cooling may also be accomplished by incorporating mold assembly segments 122 in the areas between the pipettes to be locally heated that have a different structure than the other mold assembly segments 122 of the mold assembly 120. For example, at least one of the mold assembly segment 122 in the areas between the pipettes may have a cored out back side. As used herein, the term "cored out" is used to describe a portion of a structure where distinct walls and ribs are formed in lieu of a continuous solid portion. In part design, cored-out designs are commonly used to reduce wall thickness, reduce overall weight and often to reduce costs of a part. The cored out back side of the at least one of the mold assembly segment 122 as described herein lowers the total thermal mass of the at least one of the mold assembly segments 122 and reduces the amount of heat that would be transferred from the pipette or pipette material to the at least one of the mold assembly segment 122. As a result, the portion of the pipette or pipette material would be local heated when in contact with the least one of the mold assembly segment 122 having the cored out back side than if the same portion of the pipette or pipette material were to be in contact with a mold assembly segment 122 that did not have a cored-out back.

EXAMPLES 10 ml and 25 ml pipettes were made according to the methods shown in FIG. 7, blow molding to form a unitary pipette. A cold preform was inserted into a blow mold and pressurized (10 psi to 20 psi) then heated with radiant heat from the mold. The process took approximately 40 minutes for the molds to heat, the form to expand and the mold to cool down. Parts were removed and measured.

Table II shows inner diameter (ID), outer diameter (OD) and thickness measurements (in mm) of the tip portion, the body portion and the mouth portion of these experimental pipettes.

TABLE II

| Pipette Volume | Tip OD | Tip ID | Tip Thickness | Body ID | Body OD | Body Thickness | Mouth ID | Mouth OD | Mouth Thickness |
|---|---|---|---|---|---|---|---|---|---|
| 10 mL | 4.57 | 2.95 | 0.81 | 7.92 | 8.66 | 0.37 | 6.77 | 7.62 | 0.42 |
| 25 mL | 6.48 | 4.06 | 1.21 | 12.70 | 13.66 | 0.48 | 5.71 | 7.62 | 0.95 |

As can be seen from Table II, the tip thickness and the mouth thickness are greater than the body thickness of experimental pipettes made by blow molding. These measurements were consistent with thicknesses predicted using modeling.

Table III shows predicted measurements using modeling of blow molding (according to the methods shown in FIG. 7). Calculated final dimensions were based on balancing the material in the preform to the final targeted part diameter and then solving for thickness.

TABLE III

| Pipette Volume | Tip OD | Tip ID | Tip Thickness | Body ID | Body OD | Body Thickness | Mouth ID | Mouth OD | Mouth Thickness |
|---|---|---|---|---|---|---|---|---|---|
| 1 mL | 3.56 | 2.03 | 0.76 | 2.95 | 4.14 | 0.61 | 2.95 | 4.14 | 0.61 |
| 2 mL | 3.56 | 2.03 | 0.76 | 4.06 | 5.00 | 0.46 | 4.06 | 5.00 | 0.46 |
| 5 mL | 3.51 | 1.57 | 0.97 | 5.97 | 6.74 | 0.39 | 6.95 | 6.73 | 0.34 |
| 10 mL | 3.51 | 1.57 | 0.97 | 7.92 | 8.52 | 0.30 | 6.95 | 7.62 | 0.34 |
| 25 mL | 5.21 | 2.24 | 1.49 | 12.70 | 13.54 | 0.42 | 6.00 | 7.62 | 0.81 |
| 50 mL | 5.21 | 3.05 | 1.08 | 15.88 | 16.43 | 0.28 | 6.34 | 7.62 | 0.64 |
| 100 mL | 6.35 | 3.18 | 1.59 | 22.35 | 23.02 | 0.33 | 5.27 | 7.62 | 1.17 |

Table III illustrates that, using modeled data, pipettes formed by the methods shown in FIG. 7 and FIG. 8 will result in pipettes having thicker tip and/or mouth regions compared to the body thickness. In some embodiments, only one of the tip or the mouth is thicker than the body thickness. These data are exemplary. Molding conditions can be adjusted, or a profiled or shaped parison can be used to modulate thicknesses at the tip or the mouth.

Table IV shows blow molding followed by a draw of the tip portion (according to the methods shown in FIG. 8) techniques. Using this technique, with a tip draw following formation of the pipette by blow molding or vacuum molding, the tip thickness may be any thickness, depending on the extent to which the tip is drawn following forming of the pipette.

TABLE IV

| Pipette Volume | Tip OD | Tip ID | Tip Thickness | Body ID | Body OD | Body Thickness | Mouth ID | Mouth OD | Mouth Thickness |
|---|---|---|---|---|---|---|---|---|---|
| 5 mL | 2.50 | 1.80 | 0.35 | 7.40 | 8.00 | 0.29 | 7.42 | 8.00 | 0.29 |
| 10 mL | 3.43 | 1.52 | 0.95 | 7.92 | 9.02 | 0.56 | 6.73 | 8.00 | 0.64 |

Table V illustrates measurements taken from prior art examples of pipettes (in mm) (Costar and ALP brand pipettes) made by traditional means. The first column shows unitary pipettes made by drawing. The second column shows pipettes made by drawing a body, and then attaching a tip or, in examples, a tip and a mouth may be attached in a separate manufacturing step. Table V shows that, in the prior art examples measured, body thickness was generally greater than or equal to the mouth thickness. While the mouth thickness of the assembled pipettes may be thicker than the thickness of the body, these pipettes are assembled by drawing a pipette body and then attaching a mouth part to the pipette body. There will always be a seam or a mismatch or a step or a bump or a ridge in the internal or external surface of the pipette where this connection is made. In addition, there may be residue or particulate created during the assembly process (ultrasonic welding, for example) which may create unwanted contaminants inside the pipette. For smaller pipettes, the 1 ml and 2 ml pipettes, it is not practical to assemble pipettes by adding a mouth or a tip (*). These pipettes are too small. For the larger pipettes, it is not practical to draw pipettes. These traditionally require assembly (**).

TABLE V

| Pipette Volume | Tip Thickness Unitiary Pipette Prior Art (drawn) (mm) | Tip Thickness Assembled Pipette Prior Art (mm) | Body Thickness Unitary Pipette (drawn) (mm) | Body Assembled thickness Prior Art (mm) | Thickness Mouth Prior Art (mm) |
|---|---|---|---|---|---|
| 1 mL | 0.50 | NA* | 0.81 | NA | 0.81 |
| 2 mL | 0.75 | NA* | 1.21 | NA | 1.21 |
| 5 mL | 0.30 | NA* | 1.02 | 1.02 | 1.02 |
| 10 mL | 0.33 | 0.90 | 1.30 | 0.80 | 1.02 |
| 25 mL | 0.38 | 1.50 | 1.70 | 0.81 | 1.02 |
| 50 mL | NA** | 1.10 | NA** | 1.02 | 1.02 |
| 100 mL | NA** | 1.60 | NA** | 1.02 | 1.02 |

According to an aspect (1) of the present disclosure, a method for producing pipettes is provided. The method comprises: extruding a polymer melt into at least one mold segment of a mold assembly having a plurality of mold segments to form a parison or preform, wherein the plurality of mold segments comprise cavities that are shaped to form pipettes when in communication with the cavity of an adjacent mold segment; forming at least two pipettes in the shape of the mold segment cavities by blow-molding or vacuum forming the parison or preform, each of the at least two pipettes having proximal and distal ends; heating the pipettes to form a locally heated portion of the at least two pipettes; and separating the pipettes by cutting the locally heated portion of the at least two pipettes with a separation feature.

According to an aspect (2) of the present disclosure, the method of aspect (1) is provided, wherein forming at least two pipettes in the shape of the mold segment cavities comprises blow-molding the parison or preform.

According to an aspect (3) of the present disclosure, the method of aspect (1) is provided, wherein forming at least two pipettes in the shape of the mold segment cavities comprises vacuum forming the parison or preform.

According to an aspect (4) of the present disclosure, the method of any of aspects (1)-(3) is provided, wherein the proximal and distal ends of the at least two pipettes are orifices.

According to an aspect (5) of the present disclosure, the method of any of aspects (1)-(4) is provided, wherein the at least two pipettes are arranged in the plurality of mold segments such that the proximal ends of at least two pipette are in close proximity to each other.

According to an aspect (6) of the present disclosure, the method of any of aspects (1)-(5) is provided, wherein the at least two pipettes are arranged in the plurality of mold segments such that the distal ends of at least two pipette are in close proximity to each other.

According to an aspect (7) of the present disclosure, the method of any of aspects (1)-(6) is provided, wherein the mold assembly comprises the separation feature.

According to an aspect (8) of the present disclosure, the method of any of aspects (1)-(7) is provided, wherein the separation feature comprises a through-cut feature.

According to an aspect (9) of the present disclosure, the method of aspect (8) is provided, wherein the through-cut feature is selected from the group consisting of a flying knife and a guillotine mechanism.

According to an aspect (10) of the present disclosure, the method of any of aspects (1)-(9) is provided, wherein at least one of the plurality of mold segments comprises a cored out portion.

According to an aspect (11) of the present disclosure, the method of aspect (10) is provided, wherein the at least one of the plurality of mold segments comprising a cored out portion contacts the locally heated portion of the at least two pipettes.

According to an aspect (12) of the present disclosure, the method of any of aspects (1)-(11) is provided further comprising printing the at least one mold segment to create mold surface features, wherein forming at least two pipettes comprises forming pipette surface features on the at least two pipettes corresponding to the mold surface features.

According to an aspect (13) of the present disclosure, the method of any of aspects (1)-(12) is provided further comprising depositing ink on a surface of the at least one mold segment, wherein forming at least two pipettes comprises transferring the ink to a surface of the at least two pipettes.

According to an aspect (14) of the present disclosure, the method of any of aspects (1)-(13) is provided further comprising inserting a filter into the proximal aperture of at least one of the at least two pipettes.

While the present disclosure has been described with respect to a limited number of embodiments, those skilled in the art, having benefit of this disclosure, will appreciate that other embodiments can be devised which do not depart from the scope of the present disclosure as disclosed herein. Accordingly, the scope of the present disclosure should be limited only by the claims.

What is claimed is:

1. A method for producing pipettes, the method comprising:
    extruding a polymer melt to form a parison or preform in at least one mold segment of a mold assembly having a plurality of mold segments, wherein the plurality of mold segments comprise cavities that are shaped to form pipettes when in communication with the cavity of an adjacent mold segment;
    forming at least two pipettes in the shape of the mold segment cavities by blow-molding or vacuum forming the parison or preform, each of the at least two pipettes having proximal and distal ends;
    heating the pipettes to form a locally heated portion of the at least two pipettes; and
    separating the pipettes by cutting the locally heated portion of the at least two pipettes with a separation feature.

2. The method of claim 1, wherein forming at least two pipettes in the shape of the mold segment cavities comprises blow-molding the parison or preform.

3. The method of claim 1, wherein forming at least two pipettes in the shape of the mold segment cavities comprises vacuum forming the parison or preform.

4. The method of claim 1, wherein the proximal and distal ends of the at least two pipettes are orifices.

5. The method of claim 1, wherein the at least two pipettes are arranged in the plurality of mold segments such that the proximal ends of at least two pipette are in close proximity to each other.

6. The method of claim 1, wherein the at least two pipettes are arranged in the plurality of mold segments such that the distal ends of at least two pipette are in close proximity to each other.

7. The method of claim 1, wherein the mold assembly comprises the separation feature.

8. The method of claim 1, wherein the separation feature comprises a through-cut feature.

9. The method of claim 8, wherein the through-cut feature is selected from the group consisting of a flying knife and a guillotine mechanism.

10. The method of claim 1, wherein at least one of the plurality of mold segments comprises a cored out portion.

11. The method of claim 10, wherein the at least one of the plurality of mold segments comprising a cored out portion contacts the locally heated portion of the at least two pipettes.

12. The method of claim 1, further comprising printing the at least one mold segment to create mold surface features, wherein forming at least two pipettes comprises forming pipette surface features on the at least two pipettes corresponding to the mold surface features.

13. The method of claim 1, further comprising depositing ink on a surface of the at least one mold segment, wherein forming at least two pipettes comprises transferring the ink to a surface of the at least two pipettes.

14. The method of claim 1, further comprising inserting a filter into the proximal aperture of at least one of the at least two pipettes.

* * * * *